Patented Sept. 22, 1931

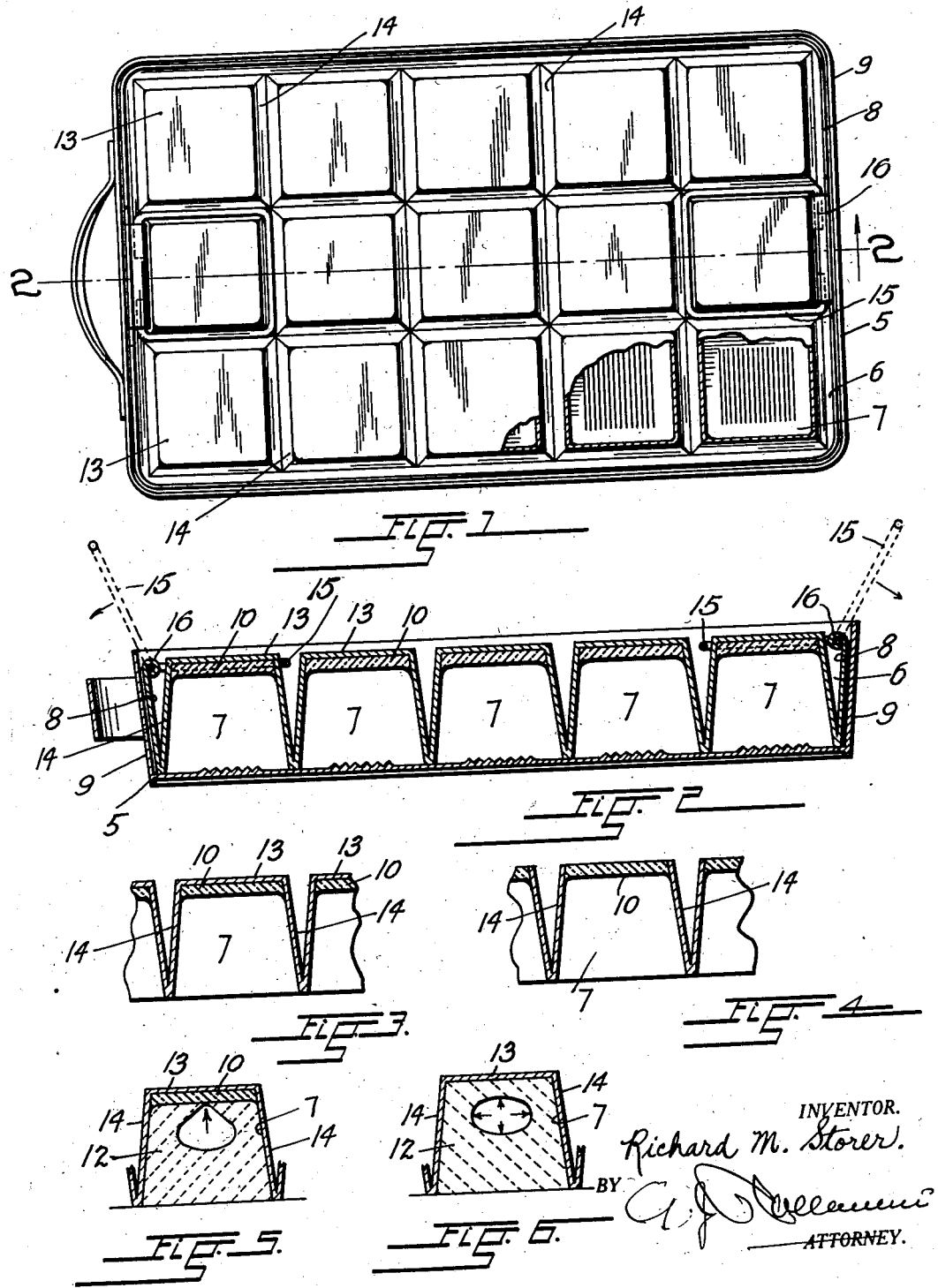

1,824,309

UNITED STATES PATENT OFFICE

RICHARD M. STORER, OF DENVER, COLORADO

MOLD FOR FREEZING LIQUIDS

Application filed September 10, 1928. Serial No. 304,886.

This invention relates to molds for freezing liquids and semi-liquids of the kind commonly used in electrical or mechanical refrigeration, and it relates more particularly to improvements in a device of the type disclosed in my application for Patent No. 289,780, filed July 2, 1928.

The device as shown and described in the aforementioned application, consists of a mold-member having a plurality of cup-shaped freezing units of truncated pyramid form, and a tray member adapted to cover the freezing units in an inverted position.

The mold-member is in practice filled with the liquid to be frozen and after the tray member is placed upon the same the entire device is inverted and subjected to a freezing temperature, preferably in the "frost unit" of a mechanical or electrical refrigerator.

The expansion of the bodies of liquid in the mold-units, upon being frozen, causes the bodies to be separated from the slanting walls of the units with the result that the mold member is readily removed, leaving the frozen bodies in place in the tray-member.

The removal of the mold-member may be aided by the provision of retension-parts at the bottom of the tray-member, which project into the frozen bodies and hold them in position while the mold member is being removed.

It has been found that by retarding the freezing action nearest the closed ends of the mold-units, all of the forces of expansion will be directed toward said ends with the result that the mold-member is lifted automatically from the frozen bodies with greater ease than before since any wedging action as might occur by the expansion of the bodies against the slanting sides of the units, is eliminated.

It is an object of the present invention to provide simple means for retarding the freezing action at the closed ends of the mold-units for the above stated purpose, and another object is to provide improved retention means for holding the frozen bodies in the tray member when the mold-member is removed. Still another object resides in the provision of improved means for removing the mold member from the tray and frozen bodies.

With the above objects in view, my invention consists in the construction and arrangement of parts shown in the accompanying drawings and hereinafter to be described in detail.

In the drawings in the several views of which like parts are similarly designated, Figure 1 represents a partially broken plan view of the device in operative condition, Figure 2, a section taken on the line 2—2, Figure 1, Figure 3, a fragmentary section showing one of the freezing-units of the mold-member separate from the tray-member, Figure 4, a view similar to Figure 3, showing a modified construction, and Figures 5 and 6, sections of one of the freezing units and the frozen body within the same, illustrating, diagrammatically, the action of the forces of expansion upon the walls of the units, in the ordinary construction of the units as shown in the prior application, and in the improved construction of the same disclosed herein.

Referring further to the drawings, the reference numeral 5 designates the tray-member, and 6 the mold member of the device.

The mold member consists of a plurality of units 7 of truncated pyramid form, assembled within a surrounding frame 8 that fits snugly within the wall 9 of the tray-member.

The mold-member is made of copper or other highly conductive metal and the end-walls 13 of the freezing units of the mold-member are covered interiorly with a layer 10 of non-conductive material as, for example, bakelite, that insulates the matter in the mold-units from their respective ends.

When, in the operation of the device, the filled mold-member positioned in an inverted position inside the tray-member, as shown in Figure 6, is subjected to a freezing temperature, the liquid bodies within the units of the mold-member gradually expand as they are being converted into ice.

In the old construction of the mold-member without the non-conductive covering for the end-walls of the units, as shown in Figure 2, the liquid body 12 in the unit was exposed equally at all of its sides to the freezing action, with the result that the forces of expansion were directed from the center outwardly in all directions, as indicated by the arrows.

The lateral expansion directed toward the slanting side-walls 14 of the unit, has a tendency to wedge the frozen bodies between the side-walls and the end-walls of the same, and at times interfered with the removal of the mold-member from the tray-member after the freezing process was completed. Any such tendency is completely eliminated in the present invention by the provision of the non-conducting end-wall with which the liquid body is in contact, as illustrated in Figure 5.

The presence of the insulation retards freezing of the part of the liquid body adjacent the same, with the result that expansion resulting from the freezing action, is directed upwardly to a central point, as indicated by the arrows, by reason of the fact that at that point the freezing action was slowest and the ice-wall, in consequence, is thinnest.

Lateral expansion is almost completely avoided and any pressure that would tend to wedge the frozen body between the converging walls of the mold is eliminated. The mold is thus readily removed from the frozen bodies with little or no effort, and the bodies remaining in place in the tray-member, may be separately taken away.

To facilitate removal of the mold member 8 and the unit 7 therein, handles 15 may be provided hingedly mounted at the ends of the unit as indicated at 16. It will be noted that the hinge 16 is slightly spaced from the outer edge of the respective wall 9 and if for any reason the frozen bodies should tend to stick to the sides of a unit 7, the handle 15 may be positioned, as indicated in dotted lines in Fig. 2, whereupon slight pressure in the direction of the arrows will exert a leverage which assists in loosening the mold unit from the frozen bodies.

To separate the ice-cakes from the tray, the use of a pair of tongs such as are used in handling lumps of sugar, is recommended.

While, for the sake of strength, rigidity and ease in manufacture it is preferred to form the freezing units with end-walls in integral connection with their side-walls, and cover the end-walls with layers of non-conducting material interiorly of the units, as shown in Figure 3, the metal parts of the end-walls may be eliminated, in which case the end-walls are in their entirety composed of non-conducting material, as has been illustrated in Figure 4.

The means for locking the frozen bodies to the bottom of the tray have been shown to consist of series of corrugations formed in the bottom of the tray opposite to the several units of the mold-member. It is desirable that these series be separated from each other to prevent the leakage of liquid from one freezing unit to another and from the mold-member to the space between its surrounding frame and the wall of the tray-member.

What I claim and desire to secure by Letters Patent is:

1. In a device of the character described, a mold-member including a freezing unit having conductive side-walls converging with relation to each other, and a non-conductive end-wall.

2. In a device of the character described, a mold-member including a freezing unit having conductive side-walls and a conductive end-wall in integral connection therewith, and a non-conductive layer covering the end-wall inside the unit, exclusive of the side-walls.

3. In a device of the character described, a mold-member including a freezing unit having conductive side-walls converging with relation to each other, and a conductive end-wall in integral connection therewith, and a non-conductive covering for the end-wall, inside the unit.

4. A device of the character described comprising a tray-member and a mold-member, the latter having a plurality of freezing units, and being adapted to be placed in an inverted position upon the bottom of the tray-member, said bottom having separated series of corrugations registering with the units of the mold-member.

5. A device of the character described comprising a tray member and a mold member adapted to be placed together, the latter member having a freezing unit, and a non-conductive surface in said freezing unit, the tray member having means opposite the non-conductive surface for engagement with a cake of ice to hold the cake upon the tray.

6. A process of freezing comprising confining a liquid, adapted to expand upon freezing, in a mold having sides converging toward a closed end, freezing the liquid, retarding the freezing action at the closed end, and applying the expansive force of freezing to the closed end of the mold, whereby the mold is lifted and separated from the ice.

7. In a device of the character described, a tray member, a member removably positioned in said tray for dividing the tray into a plurality of compartments, and means located on one of said members in position to engage and exert a leverage against the other of said members thereby to facilitate separation of the members from each other.

8. In a device of the character described, a tray member, a partitioned member removably positioned in said tray for dividing the tray into a plurality of compartments, and means located on said partitioned member in position to engage and exert a leverage against said tray member thereby to facilitate separation of the members from each other.

9. In a device of the character described, a tray member, a mold member including a freezing unit adapted for disposition in said tray, and means located on one of said members in position to engage and exert a leverage against the other of said members, thereby to facilitate separation of the members from each other.

10. A device of the character described, comprising a tray member and a mold member, the latter having a plurality of freezing units and being adapted for placement in an inverted position upon the bottom of the tray member, said bottom having a separated series of corrugations registering with the units of the mold member, and means located on one of said members in position to engage and exert a leverage against the other of said members, thereby to facilitate separation of the members from each other.

11. In a device of the character described, a tray member, a mold member including a freezing unit adapted for disposition in said tray in an inverted position, said tray member being of greater depth than said mold member, a handle hingedly attached on said mold member below an edge portion of the wall of the tray member and in position to engage and exert a leverage against said edge portion, thereby to facilitate separation of the members from each other.

In testimony whereof I have affixed my signature.

RICHARD M. STORER.